United States Patent
Wode et al.

(10) Patent No.: US 6,749,184 B2
(45) Date of Patent: Jun. 15, 2004

(54) AIR SPRING AND METHOD FOR MAKING THE SAME

(75) Inventors: Stefan Wode, Langenhagen (DE); Jens-Uwe Gleu, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/975,948

(22) Filed: Oct. 15, 2001

(65) Prior Publication Data
US 2002/0043746 A1 Apr. 18, 2002

(30) Foreign Application Priority Data
Oct. 13, 2000 (DE) .......................... 100 50 777

(51) Int. Cl.⁷ .............. F16F 5/00; F16F 9/04; F16F 9/05
(52) U.S. Cl. ............... 267/64.27; 267/122; 29/508
(58) Field of Search .................. 267/122, 64.11–64.28, 267/35, 124, 64.27; 92/98 D, 103 M, 103 SD, 98 R; 29/508, 447, 445, 235; 403/134, 135, 291, 373; 24/20 R, 20 EE

(56) References Cited

U.S. PATENT DOCUMENTS

| | | | |
|---|---|---|---|
| 3,130,965 A | * 4/1964 | Niclas | |
| 4,489,474 A | * 12/1984 | Brown et al. | ............. 29/508 |
| 4,564,177 A | 1/1986 | Leonard | |
| 4,657,229 A | 4/1987 | Thurow | |
| 4,899,995 A | 2/1990 | Hoffman et al. | |
| 5,005,808 A | * 4/1991 | Warmuth, II et al. | ..... 267/64.27 |
| 5,374,037 A | * 12/1994 | Bledsoe | |
| 5,566,929 A | 10/1996 | Thurow | |
| 5,941,509 A | * 8/1999 | Avesian et al. | ......... 267/64.27 |
| 6,036,180 A | * 3/2000 | Ecktman | ............. 267/64.27 |
| 6,371,457 B1 | * 4/2002 | Berg | ................ 267/122 |

FOREIGN PATENT DOCUMENTS

| | | |
|---|---|---|
| DE | 31 12 133 | 10/1982 |
| DE | 4118576 | * 12/1992 |
| DE | 4118577 | * 12/1992 |
| DE | 4211135 | * 10/1993 |
| DE | 10050777 | * 5/2002 |
| EP | 0 295 393 | 12/1988 |
| EP | 0 939 241 | 9/1999 |
| GB | 2098700 | * 11/1982 |

* cited by examiner

Primary Examiner—Douglas C. Butler
(74) Attorney, Agent, or Firm—Walter Ottesen

(57) ABSTRACT

An air spring includes a flexible member, which encloses an air volume, and two connecting parts. Each of the connecting parts has a clamp seat on which an end of the flexible member is attached with the aid of a clamp ring assigned to the clamp seat. The surface of at least one clamp seat is at least approximately convex and the total inner side of the clamp ring, which is assigned to the clamp seat, is configured to be at least approximately concave.

20 Claims, 3 Drawing Sheets

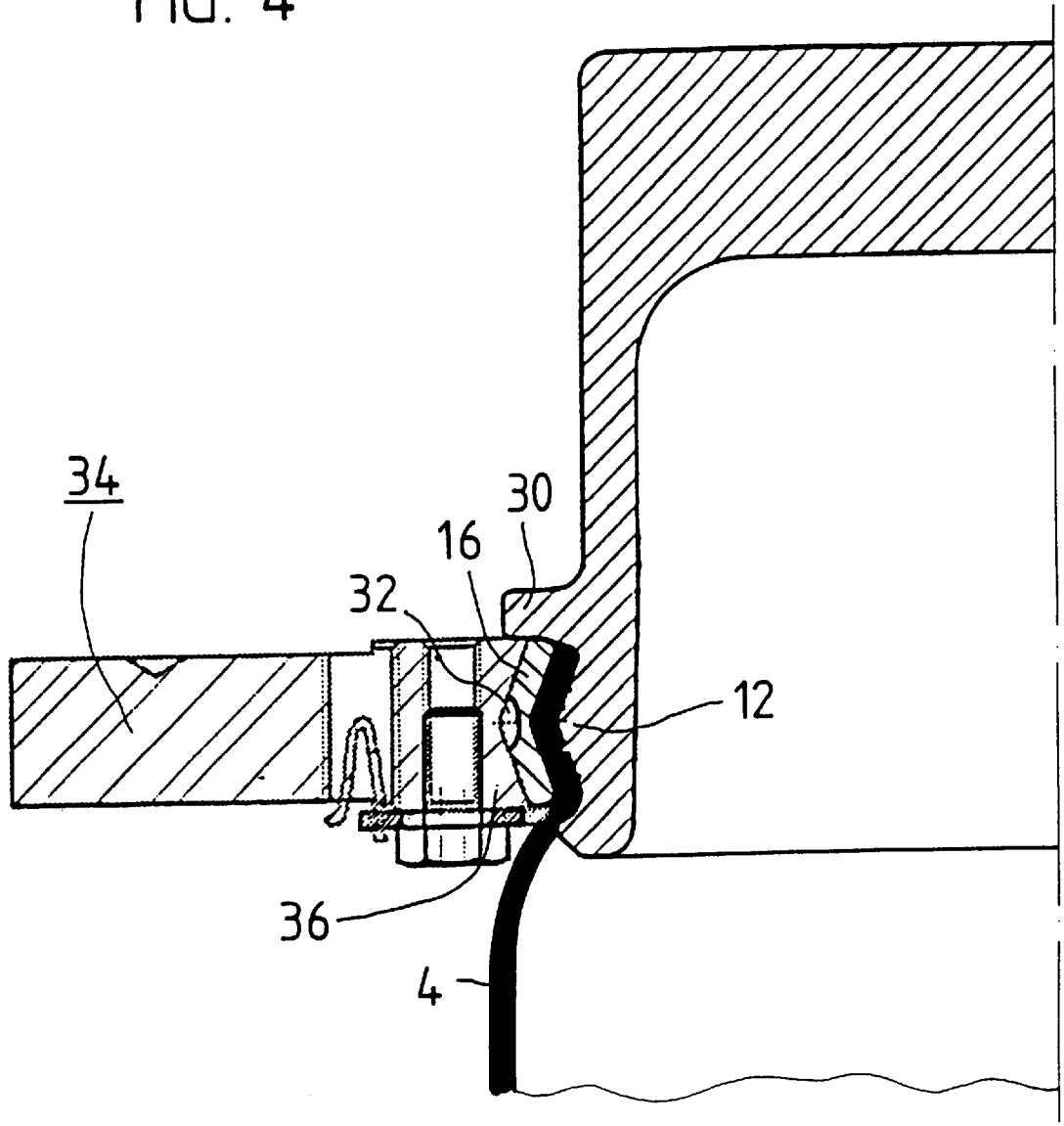

AIR SPRING AND METHOD FOR MAKING THE SAME

FIELD OF THE INVENTION

The invention relates to an air spring which includes a flexible member, which encloses an air volume, and two connecting parts. Each of the connecting parts has a clamp seat to which an end of the flexible member is attached with the aid of a clamp ring allocated to the clamp seat. The invention further relates to a method for making the air spring.

BACKGROUND OF THE INVENTION

Air springs of the above-mentioned kind are known from the state of the art as disclosed, for example, in U.S. Pat. No. 4,657,229. These air springs are especially utilized in motor vehicles for resiliently suspending the vehicle body relative to at least one axle of the vehicle. The clamp ring with which the flexible member of the air spring is attached to the clamp seat of a connecting part has an axially arranged cylindrical inner side in air springs known from the state of the art. A clamp ring of this kind can be produced in a simple manner because of its simple form. However, it is noted that the outer side of the flexible member and the clamp ring clamped thereon move relative to the clamp seat when pull or thrust loads act upon the flexible member of the air spring. The clamp ring also moves in the axial direction of the air spring because of the friction connection between the flexible member and the clamp ring. In the course of time, the clamp connection of the end of the flexible member on the clamp seat can loosen as a consequence of the axial movement of the flexible member and of the clamp ring. In the extreme case, it even can happen that the end of the flexible member is pulled off the clamp seat and the air spring suddenly becomes untight. The danger that the flexible member separates from the clamp seat is especially great when the flexible member is configured to have a thick wall because then especially large shear deformations occur in the flexible member during a dynamic loading thereof which are transferred to the clamp ring.

SUMMARY OF THE INVENTION

It is an object of the invention to provide an air spring having a clamp connection which prevents, to the greatest extent possible, a dynamic separation of the flexible member from the clamp seat. It is another object of the invention to provide a method for making such an air spring which can be carried out in a simple and cost-effective manner.

The air spring of the invention includes: a flexible member enclosing an air volume and having first and second end portions; a first connecting part having a first clamp seat for accommodating the first end portion thereon; a second connecting part having a second clamp seat for accommodating the second end portion thereon; a first clamp ring for attaching the first end portion to the first clamp seat; a second clamp ring for attaching the second end portion to the second clamp seat; and, at least one of the clamp seats being configured to be at least approximately convex and the one clamp ring corresponding to the one clamp seat having an inner side all of which is at least approximately concave.

An approximately convex surface here means a convex surface as well as a surface for which the curvature of the convex surface is substituted by straight lines connected one to the other. The same applies to the concave surface.

The basic idea of the invention is that the clamp connection, which comprises the clamp ring and the clamp seat, has a component part having an at least approximately concave surface and a component part having at least an approximately convex surface. The two components mutually engage via the end of the flexible member of the air spring.

An advantage achieved with the invention is especially that a form-tight connection is provided via the flexible member of the air spring between the clamp ring and the clamp seat of the connecting part. This form-tight connection prevents the clamp ring together with the flexible member from being pulled from the clamp seat. Here, it is noted that the clamp action of the clamp ring is even increased when the flexible member tends to pull from the clamp seat because of the dynamic load. In this case, the clamp ring migrates with the flexible member in the axial direction so that the gap width between the clamp ring and the clamp seat becomes less and the clamp action is increased.

A further advantage of the invention is that the inner surface of the clamp ring is available as an additional friction surface for the flexible member because the clamp ring cannot be pulled off with the flexible member from the clamp seat in the axial direction of the air spring. This leads to a clear increase of the holding force of the flexible member on the clamp seat.

A further advantage of the invention is that the firm seat of the clamp ring on the clamp seat reduces the wear of the flexible member in the clamping region whereby the service life of the flexible member is increased. Still another advantage of the invention is that an especially thick flexible member can be clamped with the clamp connection according to the invention so that especially stable air springs can be manufactured.

According to another feature of the invention, the convex surface of the clamp seat has a peripherally extending nose or projection. The advantage of this feature is that the projection additionally increases the holding force of the end of the flexible member on the clamp seat because the projection digs into the rubber of the flexible member.

According to another feature of the invention, the projection is located in the part of the convex surface of the clamp seat which faces toward the air volume of the air spring. The advantage of this feature is that there is still an adequate length of the flexible member available rearward of the projection (that is, on the side facing away from the air volume of the air spring) into which the holding forces caused by the projection can be directed.

According to still another feature of the invention, the length of the projection or nose corresponds to approximately 20% to 40% of the thickness which the flexible member has in the region of the clamp seat having the convex surface. The advantage of this feature is that even for a dynamic load of the flexible member, the danger is not present that the projection would bore through the flexible member.

According to still another feature of the invention, the convex surface of the clamp seat has at least one peripherally extending groove in the portion thereof facing away from the air volume of the air spring. The advantage of this feature is that a greater low-temperature tightness and a greater high-temperature tightness of the air spring can be achieved with one or several peripherally extending grooves in the above-mentioned region. This is so because the rubber material of the flexible member disposed on the clamp seat penetrates into the grooves. It has been shown that the low-temperature tightness and the high-temperature tightness are especially increased when the clamp seat includes a peripherally extending projection in addition to the at least one groove because the projection fixes the end of the flexible member in its position on the clamp seat. Preferably, the grooves have a depth of 0.3 to 0.6 mm. Furthermore, the cross sections of the grooves are preferably selected to be triangular because grooves of this kind are easy to manufacture and facilitate an easy penetration of the rubber of the flexible member.

According to another feature of the invention, the inner side of the clamp ring and the convex surface of the clamp seat conjointly define, over a region thereof, a channel tapered toward the air volume of the air spring. Preferably, this channel is formed on the part of the clamp seat which is facing away from the air volume of the air spring. The advantage of this feature is that the flexible member is clamped stronger by the tapering channel than by a channel of uniform width when forces act on the flexible member which could lead to the flexible member being pulled off of the clamp seat. For the end of the flexible member, the tapering channel defines a type of bottleneck through which the end of the flexible member cannot be easily pulled through.

According to still another feature of the invention, a peripherally extending projection or nose, which faces toward the air volume of the air spring, extends from the end of the clamp seat having the convex surface. The advantage of this feature is that the reliability is increased so that the flexible member will not be pulled off the clamp seat because the flexible member becomes clamped between the clamp ring and the above-mentioned projection when there is a pull-off movement.

According to another feature of the invention, a peripherally extending flange extends from the end of the clamp seat having the convex surface facing away from the air volume of the air spring. The advantage of this feature is that the end of the flexible member can be placed at a defined position on the clamp seat during assembly of the air spring and, with the aid of the flange, the depth to which the clamp ring is pushed over is pregiven.

According to another feature of the invention, the outer side of the clamp ring is cylindrical. The advantage of this feature is that conventional clamp tools having a cylindrical inner side can be used when making the air spring to radially press the clamp ring whereby the end of the flexible member is clamped between the clamp ring and the clamp seat.

Another feature of the invention provides that the clamp ring has a constant wall thickness over its entire height. In this case, the inner side of the clamp ring is first concavely formed during the radial pressing of the clamp ring when making the air spring utilizing a suitable clamp tool. The advantage of this embodiment is that the clamp ring can be made in a simple manner, for example, from a thin-walled tube or from band material.

According to another feature of the invention, the clamp ring has an easily bendable zone at approximately half elevation. The advantage of this feature is that the clamp ring can be easily deformed by the clamp tool when making the air spring and the concave inner side can be simply formed. The bendable zone can, for example, be provided in that the outer side of the clamp ring is provided with a peripherally extending groove at about half elevation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
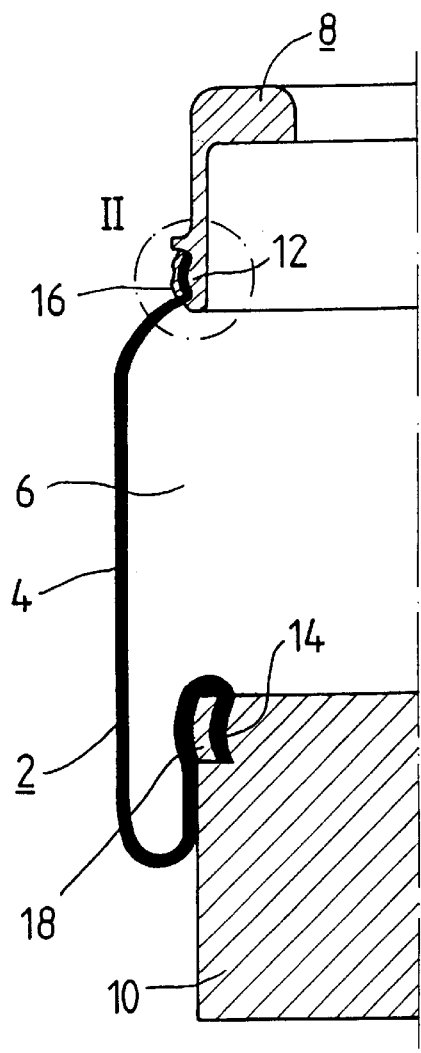
FIG. 1 is a half section view of the air spring in accordance with an embodiment of the invention.

FIG. 1 shows an air spring 2 having a flexible member 4 which encloses an air volume 6. Air springs of this kind are especially used in motor vehicles in order to spring suspend the vehicle body of the motor vehicle relative to at least one vehicle axle. The flexible member 4 is clamped between a first connecting part 8 in the form of a cover and a second connecting part 10 in the form of a roll-off piston. For this purpose, the respective ends of the flexible member 4 are pushed over respective clamp seats (12, 14) of the connecting parts (8, 10), respectively, and are clamped with the aid of respective clamp rings (16, 18). The surface of the clamp seat (12, 14), which faces toward the flexible member 4, is at least approximately convex and the entire inner side of the clamp ring (16, 18), which faces toward the flexible member 4, is configured to be at least approximately concave.

Figure 2:
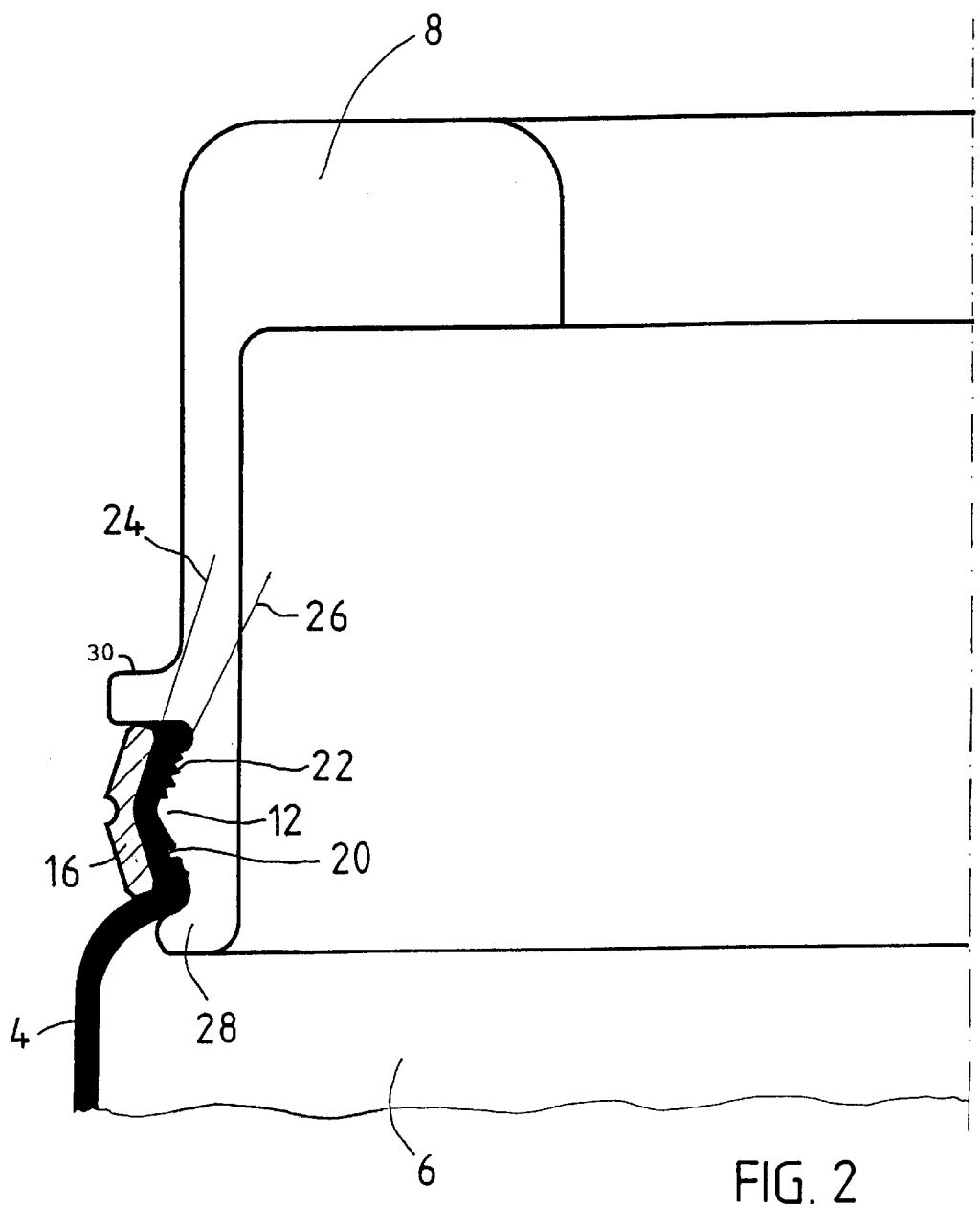
FIG. 2 is an expanded view of the detail region identified by reference numeral II in FIG. 1.

FIG. 2 shows a detail view of a portion of FIG. 1 and is referred to in the following to explain in greater detail the clamp connection comprising the clamp seat 12 and the clamp ring 16. The surface of the clamp seat 12, which faces toward the flexible member 4, is configured to be at least approximately convex; whereas, the inner side of the clamp ring 16, which faces toward the flexible member 4, is configured to be at least approximately concave. A form-tight connection is provided by the convex-concave configuration of the clamp connection which results between the clamp seat 12 and the clamp ring 16 with the flexible member 4 clamped therebetween. This form-tight connection substantially prevents an axial pull-off of the clamp ring 16 from the clamp seat 12.

The convex surface of the clamp seat 12 has a peripherally extending nose 20 in that portion of this surface which faces toward the air volume 6 of the air spring and is facing away from the connecting part 8. The nose 20 supports a fixing of the end of the flexible member 4 on the clamp seat 12 with the aid of the clamp ring 16 and makes a pull-off of the flexible member 4 from the clamp seat 12 more difficult. Preferably, the length of the nose 20 corresponds approximately to 20% to 40% of the thickness which the flexible member 4 has in the region of the clamp seat 12. A dimensioning of the nose 20 in this manner prevents the nose from boring through the end of the flexible member 4 which is disposed on the clamp seat 12. Nonetheless, it is ensured with this kind of dimensioning that the nose 20 digs sufficiently deep into the end of the flexible member 4 in order to reliably fix this end on the clamp seat 12.

In addition to the nose 20, the convex surface of the clamp seat 12 includes several peripherally extending grooves 22 which are located on the part of the convex surface of the clamp seat 12 which faces away from the air volume 6 of the air spring, that is, the grooves 22 face toward the connecting part 8. The peripherally extending grooves 22 preferably have a triangular cross section. Rubber material of the flexible member 4 penetrates into the grooves 22 when the end of the flexible member 4 is pressed onto the clamp seat 12 with the aid of the clamp ring 16 so that, in the region of the clamp seat 12, a high level of air tightness of the air spring 2 is ensured also for high and low temperatures.

A pull-off of the flexible member 4 from the clamp seat 12 is made still more difficult than with the above-mentioned measures in that the inner side of the clamp ring 16, which faces toward the flexible member 4, and the convex surface of the clamp seat 12 on the side of the clamp connection, which faces away from the air volume 6, form a channel which tapers toward the air volume 6 of the air spring. The tapering of the channel is indicated in FIG. 2 by the tangents 24 and 26 to the inner side of the clamp ring and to the convex surface of the clamp seat 12, respectively.

A peripherally extending projection 28 extends from the end of the clamp seat 12 which faces toward the air volume 6 of the air spring. The end of the flexible member 4, which is clamped on the clamp seat 12 with the aid of the clamp ring 16, is additionally clamped between the end of the clamp ring 16, which faces toward the air volume 6, and the projection 28. This clamping action becomes greater when an attempt is made to pull the flexible member 4 off the clamp seat 12 because then, the gap width between the end of the clamp ring 16 and the projection 28 becomes less.

A peripherally extending flange 30 joins at the end of the clamp seat 12 which faces away from the air volume of the air spring; that is, the flange 30 faces toward the connecting part 8. The flange 30 fixes the push-on depth of the flexible member 4 onto the clamp seat 12 and furthermore defines a stop for the clamp ring 16.

FIG. 2 is a detail of FIG. 1 and shows the clamp connection of the flexible member 4 against the connecting part 8. The clamp connection of the flexible member 4 can, however, be formed in the same way on the connecting part 10.

Figure 3A:
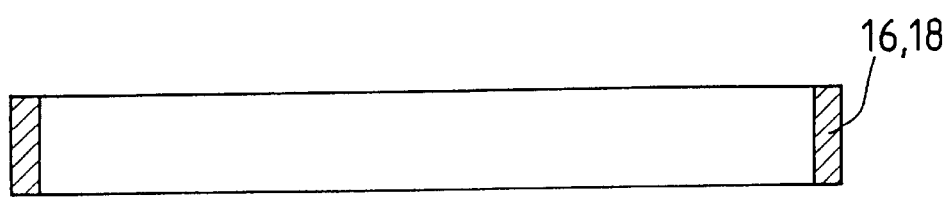
FIG. 3a is a section view of a clamp ring according to one embodiment of the invention.
Figure 3B:
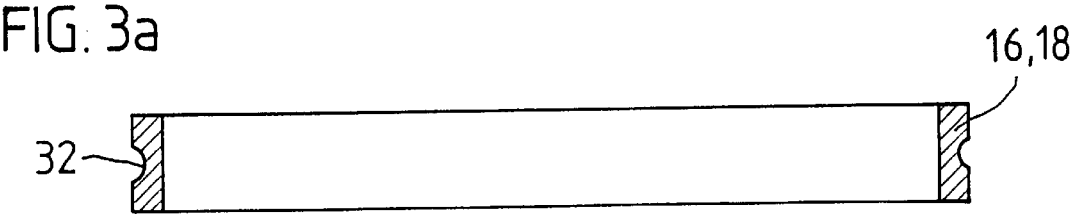
FIG. 3b is a section view of a clamp ring according to another embodiment of the invention.

FIG. 3a shows a cylindrical clamp ring (16, 18) which has a constant wall thickness over its entire elevation. A clamp ring (16, 18) of this kind is deformed by a clamp tool during clamping of the end of the flexible member onto the clamp seat so that the inner side of the clamp ring is deformed to be at least approximately concave. How this takes place is explained with respect to FIG. 4. The deformation of the clamp ring (16, 18) utilizing the clamp tool is made simpler when the clamp ring (16, 18) is provided with a soft-bending zone at about half elevation thereon. A clamp ring (16, 18) of this kind is shown in FIG. 3b wherein the soft-bending zone is formed in that the clamp ring (16, 18) includes a peripherally extending groove 32 at its outer side at approximately half elevation.

Figure 3C:
FIG. 3c is a section view of a clamp ring showing still another embodiment thereof; and, FIG. 4 is a side elevation view showing how the clamp ring is fixed in position on the clamp seat in accordance with an embodiment of the method of the invention.

FIG. 3c shows a clamp ring (16, 18) whose outer side is configured to be cylindrical and whose inner side is configured to be already at least approximately concave. A clamp ring (16, 18) of this kind needs only to be pressed radially for clamping an end of the flexible member to a clamp seat. This affords the advantage that conventional clamping tools can be used for pressing the clamp ring (16, 18).

In the following, it will be explained together with FIG. 4 how an air spring of the kind shown in FIG. 1 is manufactured. The air spring has a clamp connection in accordance with FIG. 2 at least at one of its connecting parts (8, 10).

First, the flexible member 4 of the air spring is positioned on the clamp seat 12 in such a manner that the upper end of the flexible member 4 is in contact engagement with the flange 30.

Thereafter, a cylindrical clamp ring 16 in accordance with FIG. 3b is made available in such a manner that it encloses the end of the flexible member. The clamp ring 16 is radially pressed utilizing a clamp tool 34 in such a manner that the flexible member 4 is clamped between the clamp seat 12 and the clamp ring 16 and is locked or jammed in place. During pressing, the clamp ring 16 (which had the form shown in FIG. 3b before pressing), is deformed by the clamp tool in such a manner that the inner side of the clamp ring is at least approximately concave. For this purpose, the clamp tool 34 has a clamp jaw 36, whose inner side (that is, the side facing toward the clamp ring 16) has that surface which the inner side of the clamp ring 16 is intended to have after pressing. The clamp ring 16 deforms easily during radial pressing via the clamp tool because of the peripherally extending groove 32 in the clamp ring (see also FIG. 3b).

It is understood that the foregoing description is that of the preferred embodiments of the invention and that various changes and modifications may be made thereto without departing from the spirit and scope of the invention as defined in the appended claims.

What is claimed is:

1. An air spring comprising:
   a flexible member enclosing an air volume and having first and second end portions;
   a first connecting part having a first clamp seat for accommodating said first end portion thereon;
   a second connecting part having a second clamp seat for accommodating said second end portion thereon;
   a first clamp ring for attaching said first end portion to said first clamp seat;
   a second clamp ring for attaching said second end portion to said second clamp seat;
   at least one of said clamp seats being configured to be at least approximately convex and one of said clamp rings corresponding to said one clamp seat and having an inner side all of which is at least approximately of a concave shape; and,
   said one clamp ring being made of deformable material so as to deform to cause said inner side to assume said concave shape when pressed into clamping position.

2. The air spring of claim 1, wherein said one clamp seat has a peripherally-extending nose which digs into the one end portion of said flexible member held between said one clamp ring and said one clamp seat.

3. The air spring of claim 2, wherein said one clamp seat has a convex surface and a first portion of said convex surface faces toward said air volume; and, said peripherally-extending nose is disposed in said first portion of said convex surface.

4. The air spring of claim 3, wherein said one end portion has a predetermined thickness in the region between said one clamp ring and said one clamp seat; and, said nose has a length extending from said clamp seat which corresponds to approximately 20% to 40% of said predetermined thickness.

5. The air spring of claim 3, wherein a second portion of said convex surface faces away from said air volume; and, said one clamp seat has at least one peripherally-extending groove formed in said second portion of said convex surface.

6. The air spring of claim 1, wherein said one clamp seat has a convex surface; said convex surface and said inner side of said one clamp ring conjointly defining an annular channel and said channel is a tapered channel narrowing in a direction toward said air volume.

7. The air spring of claim 3, wherein said peripherally-extending nose is a first nose; and, a peripherally-extending second nose is located at the end of said one clamp seat facing toward said air volume.

8. The air spring of claim 1, wherein a peripherally-extending flange is located at the end of said one clamp seat facing away from said air volume.

9. The air spring of claim 1, wherein said one clamp ring has an outer surface which is cylindrical.

10. The air spring of claim 1, wherein said one clamp ring has a constant wall thickness over the entire elevation thereof.

11. A method of making an air spring which includes a flexible member enclosing an air volume and having first and second end portions; a first connecting part having a first clamp seat for accommodating said first end portion thereon; a second connecting part having a second clamp seat for accommodating said second end portion thereon; a first clamp ring for attaching said first end portion to said first clamp seat; a second clamp ring for attaching said second end portion to said second clamp seat; and, at least one of said clamp seats being configured to be at least approximately convex and one of said clamp rings corresponding to said one clamp seat and having an inner side all of which is at least approximately concave, the method comprising the steps of:

providing said one clamp ring as a clamp ring made of deformable material;

positioning said flexible member with one of said end portions on said one clamp seat;

placing said one clamp ring of deformable material in place about said one end portion of said flexible member; and, radially pressing said one clamp ring utilizing a clamping work tool so as to cause said one clamp ring to deform in such a manner that the inner side thereof becomes at least approximately concave thereby clamping said one end portion between said one clamp ring and said one clamp seat.

12. The method of claim 11, wherein said one clamp ring has a bendably soft zone at approximately half elevation thereof.

13. The air spring of claim 1, wherein said one clamp ring has a bendably soft zone at approximately half elevation thereof.

14. An air spring comprising:

a flexible member enclosing an air volume and having first and second end portions;

a first connecting part having a first clamp seat for accommodating said first end portion thereon;

a second connecting part having a second clamp seat for accommodating said second end portion thereon;

a first clamp ring for attaching said first end portion to said first clamp seat;

a second clamp ring for attaching said second end portion to said second clamp seat;

at least one of said clamp seats being configured to be at least approximately convex and one of said clamp rings corresponding to said one clamp seat and having an inner side all of which is at least approximately of a concave shape;

said one clamp ring having upper and lower peripheral edges;

said one clamp seat has a convex surface;

said convex surface and said inner side of said one clamp ring conjointly defining an annular channel wherein one of said end portions of said flexible member is held; and, said annular channel being a tapered annular channel narrowing in a direction toward said air volume so as to form a bottle neck or constriction to resist a pull-off of said flexible member from said one clamp seat during operational use of said air spring.

15. The air spring of claim 14, wherein said one clamp seat has a peripherally-extending nose which digs into the one end portion of said flexible member held between said one clamp ring and said one clamp seat.

16. The air spring of claim 15, wherein said one clamp seat has a convex surface and a first portion of said convex surface faces toward said air volume; and, said peripherally-extending nose is disposed in said first portion of said convex surface.

17. The air spring of claim 16, wherein said one end portion has a predetermined thickness in the region between said one clamp ring:and said one clamp seat; and, said nose has a length extending from said clamp seat which corresponds to approximately 20% to 40% of said predetermined thickness.

18. The air spring of claim 16, wherein a second portion of said convex surface faces away from said air volume; and, said one clamp seat has at least one peripherally-extending groove formed in said second portion of said convex surface.

19. The air spring of claim 14, wherein said one clamp ring is made of deformable material so as to deform to cause said inner side to assume said concave shape when pressed into clamping position.

20. The air spring of claim 19, wherein said one clamp ring has a bendably soft zone at approximately half elevation thereof.

* * * * *